United States Patent

[11] 3,622,417

[72] Inventor George G. Gray, Jr.
820 Green St., 6A Willow Court, Iselin, N.J. 08830
[21] Appl. No. 843,995
[22] Filed July 23, 1969
[45] Patented Nov. 23, 1971

[54] METHOD OF FORMING MULTI-PLY HINGED ARTICLE
6 Claims, 13 Drawing Figs.

[52] U.S. Cl. ............................................... 156/213,
156/252, 156/257, 156/265, 156/268, 156/306,
156/309, 156/383, 156/528, 161/39, 161/109,
161/145, 161/149
[51] Int. Cl. .............................................. B32b 31/06
[50] Field of Search ........................................... 161/37, 39,
41–44, 116, 117, 120, 121, 123, 109; 156/209,
213, 230, 234, 235, 257, 261, 264, 265, 300, 301,
306, 383, 528; 83/648

[56] References Cited
UNITED STATES PATENTS
| 1,372,947 | 3/1921 | Gerritson | 156/261 X |
| 2,000,922 | 5/1935 | Church | 156/264 X |
| 2,217,773 | 10/1940 | Selva | 156/300 X |
| 2,390,125 | 12/1945 | Schade | 161/40 X |
| 2,647,071 | 7/1953 | Schade | 156/252 |
| 3,093,530 | 6/1963 | Lippman | 156/383 |

FOREIGN PATENTS
| 1,009,633 | 11/1965 | Great Britain | 156/209 |

Primary Examiner—William A. Powell
Attorney—Seymour A. Scholnick

ABSTRACT: A method for manufacturing toy cases and other articles with hinged sections, wherein the articles are constructed of a pair of vinyl layers with a layer of stiff cardboard between them. The method includes placing a female die, or locating plate, on a first vinyl sheet, placing a sheet of cardboard on the locating plate, the cardboard being pre-slit to facilitate punching, and moving a male die through the cardboard sheet and locating plate to punch out areas of the cardboard and move them against the vinyl sheet. Thereafter, a second vinyl sheet is placed on top of the pieces of cardboard which have been punched out, and the opposite layers of vinyl are joined together at regions between the pieces of cardboard.

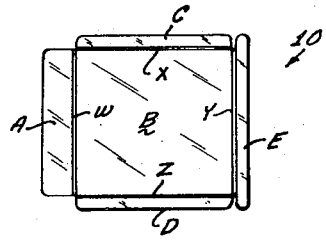
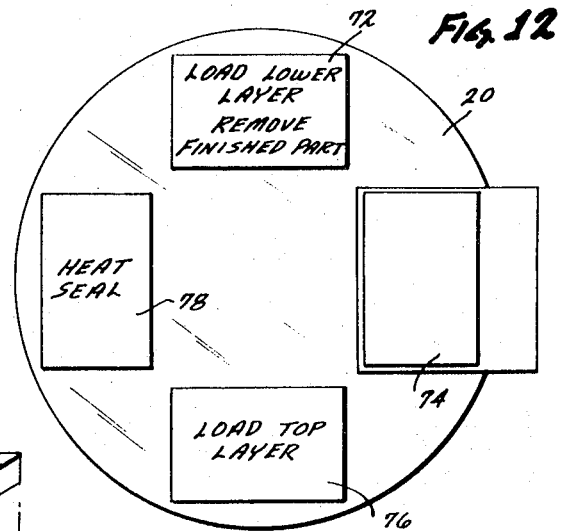
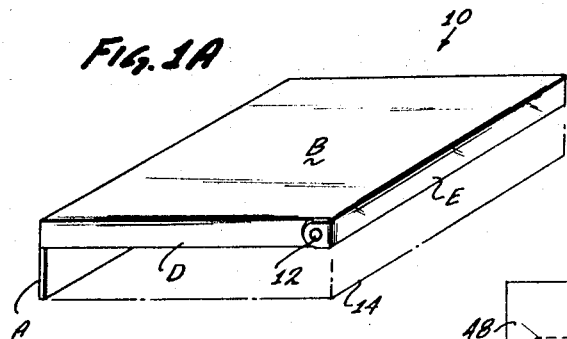
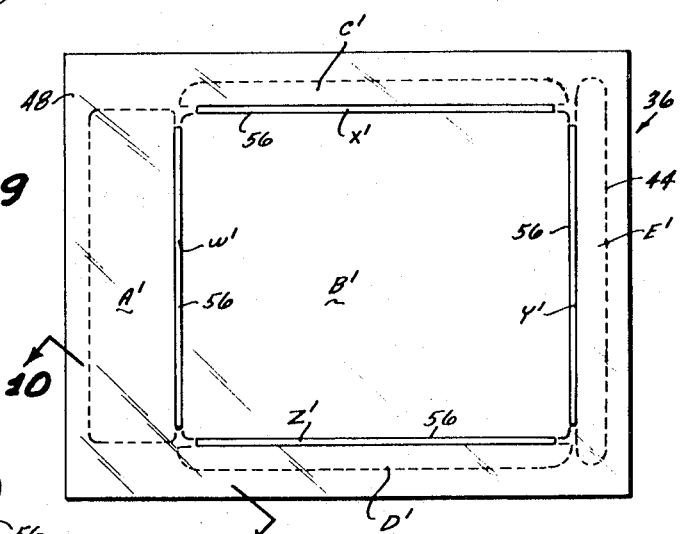
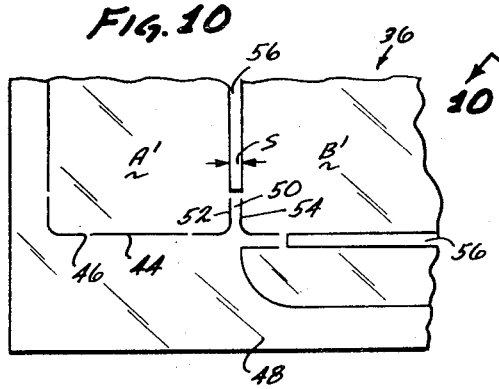
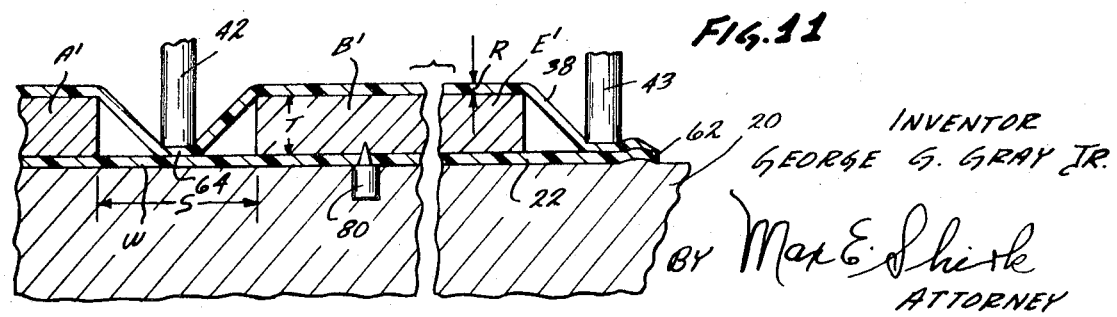

INVENTOR
GEORGE G. GRAY JR.

BY Max E. Shirk
ATTORNEY

METHOD OF FORMING MULTI-PLY HINGED ARTICLE

BACKGROUND OF THE INVENTION

1. Field of the Invention

This invention relates to a method for constructing multi-ply articles and to articles constructed thereby.

2. Description of the Prior Art

Folding articles such as toy cases have been economically constructed by employing a stiff cardboard sheet with layers of vinyl or other flexible material on either face. In order to permit folding, the cardboard sheet was divided into sections that were joined only by tabs. The tabs were provided so that the several cardboard sections, or stays, could be handled together during manufacture. However, the tabs are a disadvantage in the final product because they limit the flexibility of the article at the hinged joints and their appreciable thickness results in wrinkling of the vinyl sheet that lies at the inside of a bend. An economical manufacturing method which eliminated the need for the connecting tabs would enable the production of multi-ply folding articles of better appearance and improved performance.

OBJECTS AND SUMMARY OF THE INVENTION

An object of the present invention is to provide an economical method for manufacturing multi-ply articles with hingeably joined sections, which produces articles of superior appearance and performance.

Another object of the present invention is to provide apparatus for the economical manufacture of superior multi-ply articles with hingeably joined sections.

Yet another object is to provide an economical article with stiff hingeably joined sections, wherein the surfaces remain substantially smooth at the joints and the joints have a minimum resistance to pivoting.

In accordance with the present invention, methods and apparatus are provided for the economical construction of articles with hingeably joined sections, which are constructed with a stiff inner layer and flexible layers on either face thereof. In the construction method, a locating plate is placed on a first sheet of flexible material, a second sheet of substantially stiff material is placed on the locating plate, and portions of the second sheet are punched out and moved against the first sheet. Then, a third sheet of flexible material is placed on the punched-out sections, or stays, of the second sheet, and the first and third sheets are joined together along the narrow areas between the stays.

In one embodiment of the invention, the stiff second sheet is preslit to reduce the force necessary to punch out the stay sections therefrom. However, the slits are interrupted to keep all portions of the cardboard together so it can be handled as a single sheet. In order to eliminate the need for including long thin die portions in the locating plate, which acts as a female die during punching, slots are formed in certain areas of the cardboard sheet between adjacent stays thereof. The slotted or prepunched areas are chosen so that the remaining cardboard is integral and can be handled as a single sheet.

The novel features of the invention are set forth with particularity in the appended claims. The invention will best be understood from the following description when read in conjunction with the accompanying drawings.

BRIEF DESCRIPTION OF THE DRAWINGS

FIG. 1 is a plan view of an article constructed in accordance with the invention;

FIG. 1A is a perspective view of the article of FIG. 1, folded to its use configuration;

FIG. 9 is a plan view of a sheet of cardboard constructed in accordance with the invention for use in the process of the invention;

FIG. 10 is an enlarged view of area 10—10 of FIG. 9;

FIG. 11 is a partial enlarged view of the step of the process which is illustrated in FIG. 8; and FIG. 12 is a simplified plan view of a production system constructed in accordance with the invention.

DESCRIPTION OF THE PREFERRED EMBODIMENTS

FIG. 1 is a plan view of a doll case cover 10 constructed in accordance with the invention, which includes five hingeably joined sections labeled A through E. The cover can be folded to the configuration shown in FIG. 1A, with rivets at 12 used to join section E with sections C and D, so the cover can be mounted on a doll holding box 14. The cover 10 is of substantially three-ply construction, with outer layers of vinyl or other flexible material of good appearance and wear qualities, and an inner layer of inexpensive stiff material such as cardboard. Each of the sections A through E contains a separate cardboard piece or stay which is unconnected with the stays of the other sections. The vinyl layers are joined together around the edges of the article 10 and also along the hinge lines W, X, Y and Z where the sections are joined together. The elimination of tabs of cardboard to connect the stays of different sections of the article permits highly flexible pivoting of the sections at the joints, and the joining of the vinyl sheets at the joints substantially eliminates wrinkling of the vinyl sheets when the joints flex.

Figure 2:
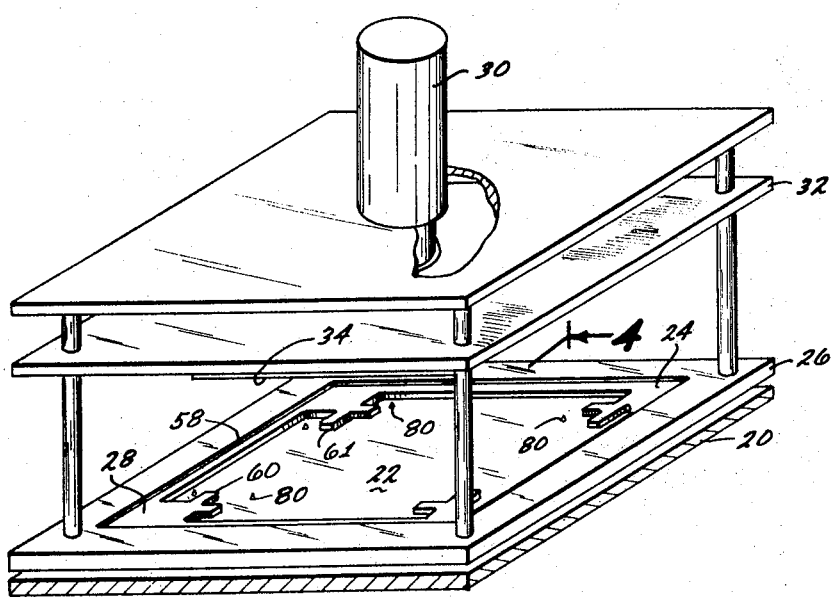
FIG. 2 is a partial perspective view of production apparatus constructed in accordance with the invention, for producing the article of FIG. 1.

FIG. 2 illustrates apparatus employed in the construction method of the invention for producing the article of FIG. 1. The apparatus includes a supporting table 20, a sheet of vinyl material 22 which has been placed on the table, and a locating plate 24 which has been placed on top of the vinyl sheet. The locating plate 24 is held on a frame 26 which can be moved down to the position shown, or moved up away from the table by lifting apparatus (not shown). In the method of the invention, a sheet of cardboard is placed on the upper surface 28 of the locating plate 24, after the plate has been placed on the vinyl sheet 22. A pneumatic cylinder 30 on the supporting frame 26 is then operated to move down a die holding plate 32. The die holding plate 32 has male die members 34 that move through the cardboard sheet on the locating plate, to punch out sections of the cardboard and move them through the locating plate against the lower vinyl sheet 22. After the cardboard pieces are punched out, the die holding plate 32 and locating plate 24 are lifted, and an upper vinyl sheet is placed over the pieces of cardboard, or stays, which have been punched out and which now lie against the lower vinyl sheet 22. Then, the two vinyl sheets are heat sealed together around the edges of the article and at the joints which lie between the punched out cardboard stays. Finally, excess vinyl material is trimmed away and the article is ready to be bent and riveted to form the article of FIG. 1A.

Figure 3:
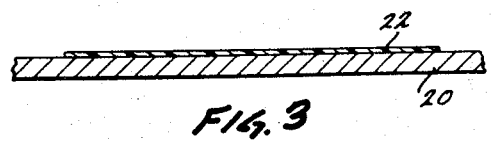
FIGS. 3 through 8 are partial sectional views taken along the lines 4—4 of FIG. 2, showing various steps of the process of the invention, only FIG. 4 showing the apparatus at the stage illustrated in FIG. 2.
Figure 4:
Figure 5:
Figure 6:
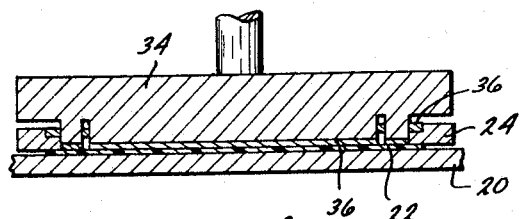
Figure 7:
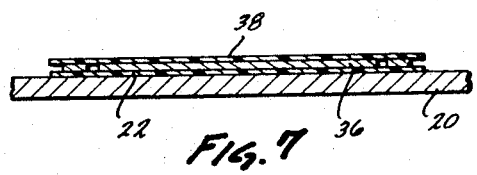
Figure 8:
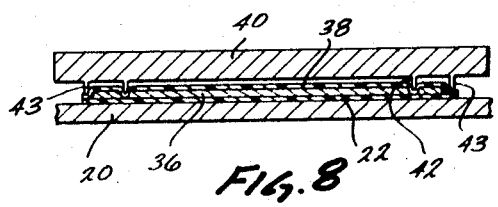

FIGS. 3 through 8 illustrate the steps of the process described above. FIG. 3 illustrates a first step wherein the sheet of vinyl 22 is placed on the support table 20. FIG. 4 illustrates the next step of lowering the locating plate 24 onto the lower vinyl sheet 22. FIG. 5 illustrates the following step of placing a sheet of cardboard 36 on top of the locating plate, so it lies in a plane which is spaced from the plane of the vinyl sheet but substantially parallel to it. FIG. 6 illustrates the next step of lowering the male die 34 to move it through the cardboard sheet 26 and locating plate 24 so that stay sections of the cardboard sheet 36 are punched out and pressed against the lower vinyl sheet 22. FIG. 7 illustrates the next step, which occurs after the locating plate, die, and cardboard remnant have been removed, comprising placing an upper vinyl sheet 38 on top of the punched out cardboard stay sections. Finally, FIG. 8 illustrates the step of heat sealing the upper and lower vinyl layers 38, 22 around the edges of the article and between the cardboard stays. The heat sealing can be performed by the member 40 which includes narrow, downwardly depending elements 42 that are coupled to a source of radio frequency currents to heat the portions of vinyl material below them, to seal the vinyl sheets together.

FIGS. 9 and 10 illustrate the sheet of cardboard 36 prior to its placement on the locating plate. It is accurately cut to provide a periphery 37 of predetermined size for locating on the locating plate. The cardboard sheet has cuts or slits 44 which define five stay sections A' through E' of cardboard to be punched from the sheet. The slits are interrupted to leave connecting regions 46 that hold the stays to the remnant 48 that is left after the stays have been punched out.

Regions 50 in the cardboard layer separate adjacent stays such as those at A' and B'. The separation between the cuts 52, 54 at region 50, provides a space between the stays, after they are punched out, which is sufficient to allow the vinyl sheets to be joined through the space to provide an easily flexed joint. The cuts 52, 54, which are separated by the distance $s$, could be extended along the entire length of hinge line W of the article. However, this would require that the locating plate have a thin die portion of width $s$ extending along the entire length of hinge line W. Such a thin web on a female die could easily become bent or distorted. To prevent the need for such a thin die portion, the cardboard sheet is provided with slots 56 along part of the hinge areas. The slots 56 eliminate the need for a female die area on the locating plate along the entire hinge area, and also reduce the force necessary to punch out the stays from the cardboard sheet.

The locating plate 24 shown in FIG. 2 forms an outline largely corresponding to the slits formed in the cardboard sheet 36. A ridge 58 is provided on the plate to engage the peripheral portion of the cardboard sheet and thereby accurately locate it thereon, although several buttons or other means can be used instead. The locating plate has female die portions for supporting one side of the cardboard sheet, including webs such as web 60 that extends partially along the hinge line W. One purpose of the web 60 is to serve as a female die portion in punching out area 50 of the cardboard sheet. However, even if the article is of a design wherein there were no region 50 of the cardboard sheet extending partly along the hinge line, the web 50 would desirable, to guide the stays A' and B' as they move through the locating plate against the lower vinyl sheet. It can be seen, however, that the web 60 is relatively short, as compared to a web which would extend along the entire length of the hinge line W. Thus, the locating plate is devoid of die portions along part of the hinge line, and there is a gap between web 60 and an opposite web 61 at the other end of the joint region. The short web 60 is not likely to become bent or broken, as would a long web.

FIG. 11 shows the manner in which the vinyl sheets are joined along a hinge line W and along an edge portion 62 of the article. The distance $s$ between adjacent cardboard stays A' and B' is sufficient to allow the heating element 42 to push the upper vinyl sheet 38 against the lower sheet 22 and join them together. The region 64 where the vinyl sheets are joined serves to keep the cardboard stays in place, as well as holding the two sheets close together so that the joining line W is thin and can easily flex. The other heating element 43 presses down on the edges of the vinyl sheets to heat seal them. As mentioned above, the heating elements can be of a type which radiates radio frequency currents to heat nearby portions of vinyl. As can be seen in FIG. 11, the width $s$ of the joint region is substantially greater than the thickness T of the stay material. This allows the upper vinyl sheet 38 to be easily depressed during the heat sealing operation, without the likelihood of tearing, and eliminates interference of the sections during pivoting of even slightly more than 90°. The vinyl sheets have a thickness R which is less than one-half the thickness T of the stays, so a relatively thin joint is provided at 64 where the vinyl sheets are sealed together, this portion of the joint being thinner than the stays and therefore being very flexible.

FIG. 12 illustrates the supporting table 20, which has four positions for performing the construction steps of the invention. The table is rotatable so that after one or more operations are performed at one station, the table can be rotated 90° to bring the parts to the next station for the next steps. The first station 72 is where a sheet of vinyl material is laid on the table. The table is then rotated to bring the vinyl sheet to a second station at 74, where the locating plate is moved down against the vinyl layer, a sheet of cardboard is placed on the locating plate, a male die is pushed through the cardboard sheet and locating plate to punch out the stays, and the locating plate and male die are lifted. The lower vinyl sheet with the cardboard stays thereon is then shifted to a third position 76 where the upper vinyl sheet is laid over the stays. The sandwich is then moved to a fourth station 78 where the vinyl sheets are heat sealed. Finally, the article is moved to the first station 72 where the article which is finished, except for riveting, is removed and a new vinyl sheet is placed on the table.

During the transfer of the partially completed article from station 74 to station 76, it is possible for the stays to shift in position unless they are held down to the lower vinyl sheet. Such holding could be accomplished by using a lower vinyl sheet with a tacky upper surface, although this can complicate handling of the vinyl sheets. Another holding method employs the use of pins, as shown at 80 in FIG. 11, which are mounted on the work table 20. The pins project through the thin lower vinyl sheet 22 and into the cardboard stays. At least two pins are provided at each stay to prevent rotation or shifting of the stay with respect to the vinyl sheet.

Thus, the invention provides a manufacturing process and apparatus therefor which enables the economical manufacture of multi-ply articles with hingedly joined sections. Of course, somewhat different article constructions can be utilized, which can be produced in accordance with the invention. For example, more than three layers may be employed, and a wide variety of materials can be utilized for the multi-ply construction.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for producing articles comprising:
   establishing stays of substantially stiff material on a first sheet of flexible material, said stays positioned so they are spaced from each other to leave joint regions between them which are devoid of portions of said stays, said step of establishing stays on a first sheet comprising locating a sheet of said stiff material, with stay portions therein, at a predetermined distance from and substantially parallel to said first sheet, and forcing said stay portions out of the rest of said sheet of stiff material and against said first sheet, said sheet of stiff material having slots therein extending along regions lying between said stay portions, said step of forcing said stay portions comprising supporting one side of said sheet of stiff material at regions around said stay portions, except along said slots, while pressing said stay portions toward said first sheet;
   establishing a second sheet of flexible material against said stays on the faces thereof opposite said first sheet; and
   sealing together said first and second sheets of flexible material along said joint regions.

2. The method described in claim 1 wherein:
   said joint regions lying between adjacent stays are wider than the thickness of said stay material.

3. A method for manufacturing hingeable articles comprising:
   placing a locating plate on a first sheet of flexible material;
   slitting a second sheet around preselected areas in a manner to leave connecting portions that hold the material in said preselected areas in place, said second sheet being constructed of a substantially rigid material;
   placing said second sheet against said locating plate, on a side of said plate opposite said first sheet;

punching out spaced preselected areas of said second sheet and moving them through said locating plate and against said first sheet;

placing a third sheet of flexible material against the faces of said preselected areas of said second sheet which are opposite said first sheet; and joining said first and third sheets at regions between said preselected areas of said second sheet.

4. The method described in claim 3 including:

removing at least one region of said second sheet lying between adjacent ones of said preselected areas prior to placing said second sheet on said locating plate, whereby to eliminate the need for a supporting plate with long thin web portions.

5. The method described in claim 3 wherein:

said step of joining said first and third sheets comprises squeezing said sheets together along narrow areas extending along said regions between said preselected areas of said second sheet, and heating said sheets along said narrow areas to heat seal them together.

6. The method described in claim 3 including:

projecting pins through said first sheet and at least partly through said preselected areas of said second sheet prior to placing said third sheet against said areas of said second sheet.

* * * * *